(12) United States Patent
Ripolles Perez (10) Patent No.: US 11,015,448 B2
(45) Date of Patent: May 25, 2021

(54) GAS TURBINE ENGINE

(71) Applicant: ROLLS-ROYCE plc, London (GB)

(72) Inventor: Marcos Ripolles Perez, Derby (GB)

(73) Assignee: ROLLS-ROYCE plc, London (GB)

( * ) Notice: Subject to any disclaimer, the term of this patent is extended or adjusted under 35 U.S.C. 154(b) by 163 days.

(21) Appl. No.: 16/183,023

(22) Filed: Nov. 7, 2018

(65) Prior Publication Data

US 2019/0178085 A1 Jun. 13, 2019

(30) Foreign Application Priority Data

Dec. 7, 2017 (GB) .................................... 1720391

(51) Int. Cl.
*F01D 5/02* (2006.01)
*F02C 7/36* (2006.01)
(Continued)

(52) U.S. Cl.
CPC ............ *F01D 5/026* (2013.01); *F01D 11/005* (2013.01); *F02C 3/10* (2013.01); *F02C 3/107* (2013.01);
(Continued)

(58) Field of Classification Search
CPC .... F02C 7/36; F02C 3/107; F02C 3/10; F01D 5/026; F16D 1/02; F05D 2240/61; F05D 2260/30
See application file for complete search history.

(56) References Cited

U.S. PATENT DOCUMENTS

| 7,921,634 B2 | 4/2011 | Orlando et al. |
| 2008/0006018 A1* | 1/2008 | Sheridan ................... F02C 3/04 60/39.1 |

(Continued)

FOREIGN PATENT DOCUMENTS

| EP | 3095986 | 11/2016 |
| EP | 3 106 714 A2 | 12/2016 |

(Continued)

OTHER PUBLICATIONS

Great Britain search report dated May 29, 2018, issued in GB Patent Application No. 1720391.0.
(Continued)

*Primary Examiner* — Andrew H Nguyen
(74) *Attorney, Agent, or Firm* — Brinks Gilson & Lione (57) ABSTRACT

A gas turbine engine comprising a fan, an intermediate pressure compressor, a high pressure compressor, a high pressure turbine, a low pressure turbine and a gearbox. The low pressure turbine is arranged to drive the intermediate pressure compressor via a shaft and an intermediate pressure compressor drive shaft and the fan via the shaft, a gearbox input shaft, the gearbox and a gearbox output shaft. The intermediate pressure compressor drive shaft has a V-shaped cross-section comprising a base, a first limb and a second limb extending from the base. An end of the first limb of the intermediate pressure compressor drive shaft is removably connected to the intermediate pressure compressor. An end of the second limb of the intermediate pressure compressor drive shaft is removably connected to the gearbox input shaft and the base of the intermediate pressure compressor drive shaft is removably connected to the shaft.

16 Claims, 5 Drawing Sheets

(51) Int. Cl.
*F02C 3/107* (2006.01)
*F01D 11/00* (2006.01)
*F02C 3/10* (2006.01)
*F02K 3/06* (2006.01)
*F16C 3/02* (2006.01)
*F16D 1/02* (2006.01)
*F16H 1/28* (2006.01)

(52) U.S. Cl.
CPC .................. *F02C 7/36* (2013.01); *F02K 3/06* (2013.01); *F16C 3/02* (2013.01); *F16D 1/02* (2013.01); *F16H 1/28* (2013.01); *F05D 2220/32* (2013.01); *F05D 2240/61* (2013.01); *F05D 2250/75* (2013.01); *F05D 2260/30* (2013.01); *F05D 2260/40311* (2013.01)

(56) References Cited

U.S. PATENT DOCUMENTS

| | | | |
|---|---|---|---|
| 2010/0105516 A1 | 4/2010 | Sheridan et al. | |
| 2012/0213628 A1* | 8/2012 | McCune | F02C 7/36 415/122.1 |
| 2013/0323077 A1* | 12/2013 | Giannakopoulos | F04D 29/321 416/93 R |
| 2013/0331222 A1* | 12/2013 | Richards | F16H 1/28 475/331 |
| 2015/0285090 A1* | 10/2015 | Munsell | F04D 29/325 415/1 |
| 2015/0322961 A1* | 11/2015 | Slotman | F04D 17/12 415/198.1 |
| 2017/0082065 A1* | 3/2017 | Swift | F02K 3/06 |

FOREIGN PATENT DOCUMENTS

| | | |
|---|---|---|
| EP | 3 109 411 A1 | 12/2016 |
| EP | 3106714 | 12/2016 |

OTHER PUBLICATIONS

Extended European Search Report, issued in European Application 18204814.0, dated Apr. 23, 2019, pp. 1-5, European Patent Office, Munich, Germany.

* cited by examiner

GAS TURBINE ENGINE

CROSS-REFERENCE TO RELATED APPLICATIONS

This application is based upon and claims the benefit of priority from British Patent Application No. GB 1720391.0, filed on 7 Dec. 2017, the entire contents of which are incorporated by reference.

BACKGROUND

Technical Field

The present disclosure concerns a gas turbine engine an in particular to a geared gas turbine engine and more particularly to a geared turbofan gas turbine engine or a geared turbo propeller gas turbine engine.

SUMMARY

Accordingly, the present invention seeks to provide a gas turbine engine comprising a gearbox in which the above mentioned problem is reduced or overcome.

According to a first aspect of the disclosure there is provided a gas turbine engine comprising a propulsor, an intermediate pressure compressor, a high pressure compressor, a high pressure turbine, a low pressure turbine and a gearbox, the high pressure turbine being arranged to drive the high pressure compressor via a high pressure shaft, the low pressure turbine being arranged to drive the intermediate pressure compressor via a low pressure shaft and an intermediate pressure compressor drive shaft, the low pressure turbine being arranged to drive the propulsor via the low pressure shaft, a gearbox input drive shaft, the gearbox and a gearbox output drive shaft, the intermediate pressure compressor drive shaft having a V-shaped cross-section, the V-shaped cross-section intermediate pressure compressor drive shaft having a base, a first limb extending from the base and a second limb extending from the base, a radially outer end of the first limb of the V-shaped cross-section intermediate pressure compressor drive shaft being removably connected to the intermediate pressure compressor, a radially inner end of the second limb of the V-shaped cross-section intermediate pressure compressor drive shaft being removably connected to the gearbox input drive shaft and the base of the V-shaped cross-section intermediate pressure compressor drive shaft being removably connected to an upstream end of the low pressure shaft.

The radially outer end of the first limb of the V-shaped cross-section intermediate pressure compressor drive shaft may be removably connected to the intermediate pressure compressor by a bolted joint.

The radially inner end of the second limb of the V-shaped cross-section intermediate pressure compressor drive shaft may be removably connected to the gearbox input drive shaft by a bolted joint and a curvic coupling or a bolted joint and a Hirth coupling.

The base of the V-shaped cross-section intermediate pressure compressor drive shaft may be removably connected to the upstream end of the low pressure shaft by a bolted joint and a curvic coupling or a bolted joint and a Hirth coupling.

The intermediate pressure compressor may comprise at least one compressor disc carrying a stage of compressor rotor blades, the at least one compressor disc comprising a hub, a web and a rim, the compressor rotor blades being arranged on the rim of the compressor disc.

The radially outer end of the first limb of the V-shaped cross-section intermediate pressure compressor drive shaft may be connected to the web of the at least one compressor disc of the intermediate pressure compressor.

The radially outer end of the first limb of the V-shaped cross-section intermediate pressure compressor drive shaft may be connected to the hub of the at least one compressor disc of the intermediate pressure compressor.

The low pressure shaft may be rotatably mounted in a static structure by a bearing, the bearing being located at an upstream region of the low pressure shaft and downstream of the upstream end of the low pressure shaft.

The gas turbine engine may comprise a propulsor support shaft, an upstream end of the propulsor support shaft being located upstream of the gearbox and being connected to the propulsor, a downstream end of the propulsor support shaft being located downstream of the gearbox, the propulsor support shaft extending through and radially inside the gearbox and the gearbox output drive shaft and the downstream end of the propulsor support shaft being rotatably mounted on the upstream end of the low pressure shaft by a bearing.

The base of the V-shaped cross-section intermediate pressure compressor drive shaft and the upstream end of the low pressure shaft may be arranged around the bearing between the downstream end of the propulsor support shaft and the upstream end of the low pressure shaft.

A seal arrangement may be provided to seal between base of the V-shaped cross-section intermediate pressure compressor drive shaft and the upstream end of the low pressure shaft.

The gearbox may comprise a sun gear, an annulus gear, a plurality of planet gears and a planet gear carrier, the sun gear meshing with the planet gears and the planet gears meshing with the annulus gear, each planet gear being rotatably mounted in the planet gear carrier.

The planet gear carrier may comprise a first ring, a second ring spaced axially from the first ring and a plurality of circumferentially spaced axles extending axially between the first ring and the second ring, each planet gear being rotatably mounted on a respective one of the axles.

The sun gear may be driven by the gearbox input drive shaft, the annulus gear being secured to static structure and the planet gear carrier being arranged to drive the propulsor.

The sun gear may be driven by the gearbox input drive shaft, the planet gear carrier being secured to static structure and the annulus gear being arranged to drive the propulsor.

The propulsor may be a fan or a propeller.

The V-shaped cross-section intermediate pressure compressor drive shaft may be a monolithic piece.

The skilled person will appreciate that except where mutually exclusive, a feature described in relation to any one of the above aspects of the invention may be applied mutatis mutandis to any other aspect of the invention.

DESCRIPTION OF THE DRAWINGS

Geared gas turbine engines have a gearbox to drive the fan or propeller. The gearbox may be a planetary gearbox which allows the speed of rotation of the fan or propeller to be reduced compared to the speed of rotation of a driving turbine. This improves the efficiency of the fan, or the propeller, and the turbine. A planetary gearbox comprises a sun gear, an annulus gear and a plurality of planet gears rotatably mounted in a planet carrier. The sun gear is arranged to be driven by the turbine, the annulus gear is fixed to static structure, the planet gears orbit around the sun gear and the planet carrier drives the fan or propeller. The gearbox may be a star gearbox which comprises a sun gear, an annulus gear and a plurality of star gears rotatably mounted in a star carrier. The sun gear is arranged to be driven by the turbine, the star carrier is fixed to static structure, the star gears rotate around their own axes and the annulus gear drives the fan or propeller.

A geared gas turbine engine generally has an intermediate pressure compressor, or booster compressor, a high pressure compressor, a high pressure turbine and a low pressure turbine. The high pressure turbine directly drives the high pressure compressor via a high pressure shaft. The low pressure turbine directly drives the intermediate pressure compressor via a low pressure shaft and an intermediate pressure compressor drive shaft. The low pressure turbine drives the fan, or propeller, via the low pressure shaft, a gearbox input drive shaft, the gearbox and a gearbox output drive shaft.

Currently, the intermediate pressure compressor drive shaft is connected to the gearbox input drive shaft at the same position that the gearbox input drive shaft is connected to the low pressure shaft. The gearbox input drive shaft is connected to the low pressure shaft by a curvic coupling and bolted joint and the intermediate pressure compressor drive shaft is connected to the gearbox input drive shaft by a taper bolted joint. Thus, the gearbox input drive shaft has taper bolts and conventional bolts extending there-through at the same radial and axial position, e.g. passing axially through a flange at the downstream end of the gearbox input drive shaft.

A problem with this arrangement is that the taper bolting of the gearbox input drive shaft to the intermediate pressure compressor drive shaft requires that apertures are machined through abutting flanges of these two components at the same time and then taper bolts are used to join the gearbox input drive shaft to the intermediate pressure compressor drive shaft. It is difficult to machine the apertures in the flanges of the gearbox input drive shaft and the intermediate pressure compressor drive shaft. In addition a set of conventional bolts is required to secure the gearbox input drive shaft to the low pressure shaft and a set of taper bolts is required to secure the intermediate pressure compressor drive shaft to the gearbox input drive shaft. The taper bolts and the conventional bolts require two sets of apertures in the flanges which reduce the amount of material in the flanges which may weaken the structure. The compressor rotor of the intermediate pressure compressor, the intermediate pressure compressor drive shaft and the gearbox input drive shaft form an intermediate pressure compressor module which is balanced as a separate unit by rotating the module through the curvic coupling on the gearbox input drive shaft. The gearbox module is balanced as a separate unit. The assembly of the gearbox module onto the intermediate pressure compressor module is difficult because it is difficult to blindly inter-engage the splines on the internal surface of the sun gear and the splines on the gearbox input drive shaft and damage to the splines may occur.

Embodiments of the disclosure will now be described by way of example only, with reference to the Figures, in which.

DETAILED DESCRIPTION

Figure 1:
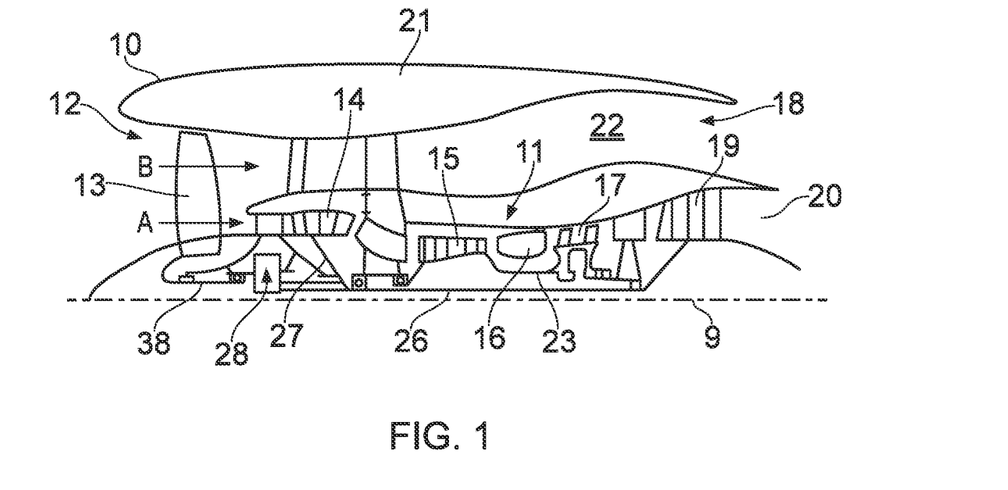
FIG. 1 is a part sectional side view of a geared turbofan gas turbine engine according to the present disclosure.
Figure 2:
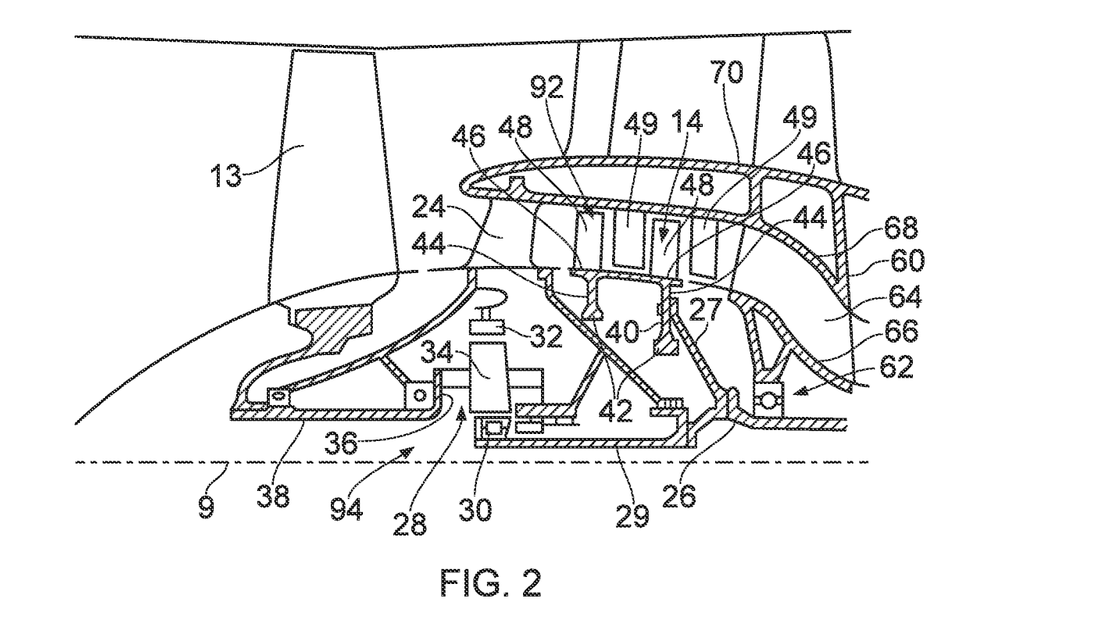
FIG. 2 is an enlarged part sectional side view of a portion of the geared turbofan gas turbine engine shown in FIG. 1.
Figure 3:
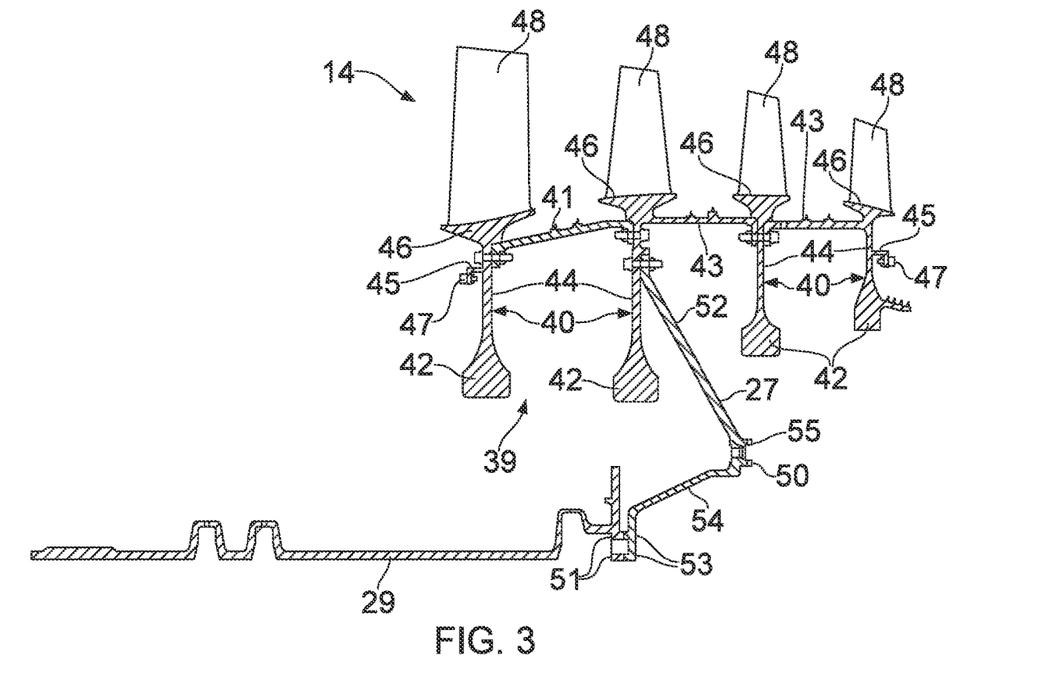
FIG. 3 is an enlarged cross-sectional view though the gearbox input drive shaft and intermediate pressure compressor drive shaft shown in FIG. 2.

With reference to FIGS. 1, 2 and 3, a geared turbofan gas turbine engine is generally indicated at 10, having a principal and rotational axis 9. The engine 10 comprises, in axial flow series, an air intake 12, a propulsive fan 13, an intermediate-pressure, or booster, compressor 14, a high-pressure compressor 15, combustion equipment 16, a high-pressure turbine 17, a low-pressure turbine 19 and a core exhaust nozzle 20. The intermediate-pressure compressor 14, the high-pressure compressor 15, the combustion equipment 16, the high-pressure turbine 17 and the low-pressure turbine 19 form a core engine 11. A nacelle 21 generally surrounds the engine 10 and defines the intake 12, a bypass duct 22 and a bypass exhaust nozzle 18.

The gas turbine engine 10 works in the conventional manner so that air entering the intake 12 is accelerated by the fan 13 to produce two air flows: a first air flow A into the intermediate-pressure compressor 14 and a second air flow B which passes through the bypass duct 22 to provide the majority of the propulsive thrust. The intermediate-pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high and low-pressure turbines 17, 19 before being exhausted through the core nozzle 20 to provide additional propulsive thrust. The high-pressure turbine 17 drives the high-pressure compressor 15 by a high pressure shaft 23. The low-pressure turbine 19 drives the intermediate-pressure compressor 14 directly via a low pressure shaft 26 and an intermediate-pressure compressor drive shaft 27. The low-pressure turbine 19 drives the fan 13 indirectly via the low pressure shaft 26, a gearbox input drive shaft 29, a gearbox 28 and a gearbox output drive shaft 38.

The gearbox 28 comprises a sun gear 30, an annulus gear 32, a plurality of planet gears 34 and a planet gear carrier 36. The sun gear 30 meshes with the planet gears 34 and the planet gears 32 mesh with the annulus gear 32. The planet gear carrier 36 constrains the planet gears 34 to precess around the sun gear 30 in synchronicity whilst enabling each planet gear 34 to rotate about its own axis independently. The planet gear carrier 36 is coupled via the gearbox output drive shaft 38 to the fan 13 in order to drive its rotation about the engine axis 9. The annulus gear 32 is coupled to a static structure 24. The axes of the planet gears 34 and the axis of the planet gear carrier 36 are parallel to the engine axis 9.

The gearbox output drive shaft 38 is rotatably mounted in static structure by one or more bearings. The one or more bearings are rolling element bearings, e.g. roller bearings or ball bearings. The gearbox output shaft 38 rotates in the same direction as the gearbox input shaft 29 but at a lower rotational speed than the gearbox input shaft 29.

The intermediate pressure compressor 14, as shown more clearly in FIGS. 2 and 3, comprises a compressor rotor 39 which comprises at least one compressor disc 40 which carries a stage of compressor rotor blades 48. The intermediate pressure compressor 14 also comprises one or more stages of compressor stator vanes 49. The at least one compressor disc 40 comprises a hub 42, a web 44 and a rim 46 and the compressor rotor blades 48 are arranged on the rim 46 of the compressor disc 40. In this example the compressor rotor 39 of the intermediate pressure compressor 14 comprises a plurality of compressor discs 40 and each carries a stage of compressor rotor blades 48, for example there may be two, three or four compressor discs 40. Each compressor disc 40 comprises a hub 42, a web 44 and a rim 46 and compressor rotor blades 48 are arranged on the rim 46 of each compressor disc 40. The compressor discs 40 are removably secured together by bolted joints to form the compressor rotor 39. There may be one or more spacer rings 41, each spacer ring 41 is provided between two axially adjacent compressor discs 40 and each spacer ring 41 is removably secured to each compressor disc 40 by a bolted joint. Alternatively, one or more of the compressor discs 40 may have an axially extending arm 43 which is removably secured to an adjacent compressor disc 40 by a bolted joint. Alternatively, there may be one or more spacer rings 41 each of which is provided between two axially adjacent compressor discs 40 and each spacer ring 41 is removably secured to each compressor disc 40 by a bolted joint and there may be one or more compressor discs 40 each of which has an axially extending arm 43 which is removably secured to an adjacent compressor disc 40 by a bolted joint. Each spacer ring 41 and/or each axially extending arm 43 is provided with one or more annular radially outwardly extending fins to mate with an abradable material on the radially inner ends of a stage of intermediate pressure compressor stator vanes 49. The plurality of compressor discs 40 and spacer rings 41 and/or axially extending arms 43 are also known as a compressor drum.

The compressor rotor blades 48 may have firtree, or dovetail, shaped roots provided in correspondingly shaped circumferentially spaced axially extending slots in the rim 46 of the corresponding compressor disc 40, the compressor rotor blades 48 may have dovetail shaped roots provided in a correspondingly shaped circumferentially extending slot in the rim 46 of the corresponding compressor disc 40 or the compressor rotor blades 48 may be integral with the rim 46 of the compressor disc 40, e.g. the compressor rotor blades 48 may be welded, linear friction welded, onto the rim 46 of the compressor disc 40 or the compressor disc 40 and compressor rotor blades 48 may have been machined from a larger blank or forging.

The intermediate pressure compressor drive shaft 27 has a V-shaped, or U-shaped, cross-section, as shown more clearly in FIG. 3, and the V-shaped cross-section intermediate pressure compressor drive shaft 27 has a base 50, a first limb 52 which extends from the base 50 and a second limb 54 which extends from the base 50. The base 50 is at a downstream end, an end nearest to the high pressure turbine 17, of the V-shaped cross-section intermediate pressure compressor shaft 27. A remote end, a radially outer end, of the first limb 52 is at an upstream end, an end nearest to the fan 13, of the V-shaped cross-section intermediate pressure compressor drive shaft 27. The remote end, a radially outer end, of the first limb 52 of the V-shaped cross-section intermediate pressure compressor drive shaft 27 is removably connected to the compressor rotor 39 of the intermediate pressure compressor 14. A remote end, a radially inner end, of the second limb 54 is also at an upstream end, an end nearest to the fan 13, of the V-shaped cross-section intermediate pressure compressor drive shaft 27. The remote end, a radially inner end, of the second limb 54 of the V-shaped cross-section intermediate pressure compressor drive shaft 27 is removably connected to the gearbox input drive shaft 29 and the base 50 of the V-shaped cross-section intermediate pressure compressor drive shaft 27 is removably connected to an upstream end of the low pressure shaft 26. The first limb 52 extends in an axially upstream and radially outwardly direction form the base 50 of the V-shaped cross-section intermediate pressure compressor drive shaft 27 and the second limb 54 extends in an axially upstream and radially inwardly direction form the base 50 of the V-shaped cross-section intermediate pressure compressor drive shaft 27. The V-shaped, or U-shaped, cross-section intermediate pressure compressor drive shaft 27 is a single piece, a monolithic piece, and may be formed by forging and machining the forging.

The radially outer end of the first limb 52 of the V-shaped cross-section intermediate pressure compressor drive shaft 27 is removably connected to the compressor rotor 39 of the intermediate pressure compressor 14 by a bolted joint. The radially inner end of the second limb 54 of the V-shaped cross-section intermediate pressure compressor drive shaft 27 is removably connected to a half of a curvic coupling 51 on the gearbox input drive shaft 29 by a half of a curvic coupling 53 and fasteners, e.g. nuts and bolts. The base 50 of the V-shaped cross-section intermediate pressure compressor drive shaft 27 is removably connected to a half of a curvic coupling 57 on the upstream end of the low pressure shaft 26 by a half of a curvic coupling 55 and fasteners, e.g. nuts and bolts. The radially outer end of the first limb 52 of the V-shaped cross-section intermediate pressure compressor drive shaft 27 is removably connected to the web 44 of one of the compressor discs 40 of the compressor rotor 39 of the intermediate pressure compressor 14. The radially outer end of the first limb 52 has a radially outwardly extending flange which is bolted to the web 44 of a compressor disc 40 of the compressor rotor 39 of the intermediate pressure compressor 14.

The low pressure shaft 26 is rotatably mounted in a static structure 60 by a bearing 62. The bearing 62 is a rolling element bearing, e.g. a ball bearing. The bearing 62 is located at an upstream region of the low pressure shaft 26 and downstream of the upstream end of the low pressure shaft 26. The bearing 62 may be located axially between the upstream end of the intermediate pressure compressor 14 and the downstream end of the intermediate pressure compressor 14 if there are three or four compressor discs 40 as shown in FIG. 3. The bearing 62 may be located axially downstream of the intermediate pressure compressor 14 if there are two compressor discs 40, as shown in FIG. 2. The static structure 60 comprises a plurality of circumferentially spaced struts, or vanes, 64 located in the flow path axially between the intermediate pressure compressor 14 and the high pressure compressor 15. The struts 64 extend radially between an inner annular member 66 and an outer annular member 68 and the outer annular member 68 is secured to a core engine casing 70 of the core engine 11.

In operation the V-shaped cross-section intermediate pressure compressor drive shaft 27 is driven by the low pressure shaft 26 via the bolted joint and the half curvic couplings 57 and 55 at the upstream end of the low pressure shaft 26 and the base 50 of the V-shaped cross-section intermediate pressure compressor drive shaft 27 respectively. The V-shaped cross-section intermediate pressure compressor drive shaft 27 transmits drive to the compressor rotor 39 of the intermediate pressure compressor 14 via the bolted joint at the radially outer end of the first limb 52 of the V-shaped cross-section intermediate pressure compressor drive shaft 27. The V-shaped cross-section intermediate pressure compressor drive shaft 27 also transmits drive to the gearbox input drive shaft 29 via the bolted joint and the half curvic couplings 53 and 51 at the radially inner end of the second limb 54 of the V-shaped cross-section intermediate pressure compressor drive shaft 27 and the downstream end of the gearbox input drive shaft 29 respectively.

Figure 4:
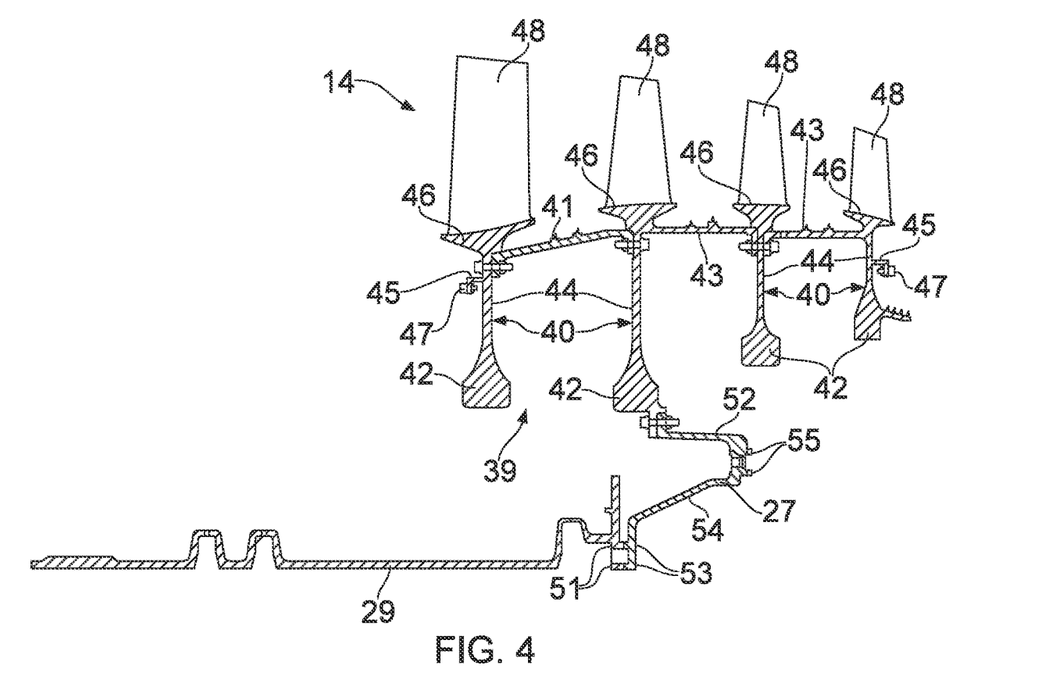
FIG. 4 is an alternative enlarged cross-sectional view though the gearbox input drive shaft and intermediate pressure compressor drive shaft shown in FIG. 2.

An alternative arrangement is shown in FIG. 4 and the arrangement in FIG. 4 is substantially the same as the arrangement shown in FIG. 3 and like parts are denoted by like numerals. The arrangement in FIG. 4 differs in that the radially outer end of the first limb 52 of the V-shaped, or U-shaped, cross-section intermediate pressure compressor drive shaft 27 is connected to the hub 42 of the at least one compressor disc 40 of the compressor rotor 39 of the intermediate pressure compressor 14. The radially outer end of the first limb 52 has a radially outwardly extending flange which is bolted to a radially inwardly extending flange on the hub 42 of a compressor disc 40 of the intermediate pressure compressor 14. In another minor variation the flange on the hub 42 of the compressor disc 40 is provided on an axially extending arm and the flange extends radially inwardly or radially outwardly from the arm and the radially outer end of the first limb 52 is provided with a radially outwardly extending flange or a radially inwardly extending flange. The advantage of this arrangement is that there is reduction in the weight of the V-shaped cross-section intermediate pressure compressor drive shaft 27 and hence a reduction in weight of the geared turbofan gas turbine engine 10. In addition it enables the compressor rotor 39 of the intermediate pressure compressor 14 to be built up by sequentially securing axially adjacent compressor discs 40 together before the intermediate pressure compressor drive shaft 27 is connected to the hub 42 of the compressor disc 40. Alternatively the compressor rotor 39 of the intermediate pressure compressor 14 is built up in the same manner as that for the FIG. 3 by sequentially securing axially adjacent compressor discs 40 together until the compressor disc 40 to which the intermediate compressor drive shaft 27 is to be attached and then attaching the intermediate compressor drive shaft 27 to that compressor disc 40 and then continuing sequentially securing axially adjacent compressor discs 40 together.

Figure 5:
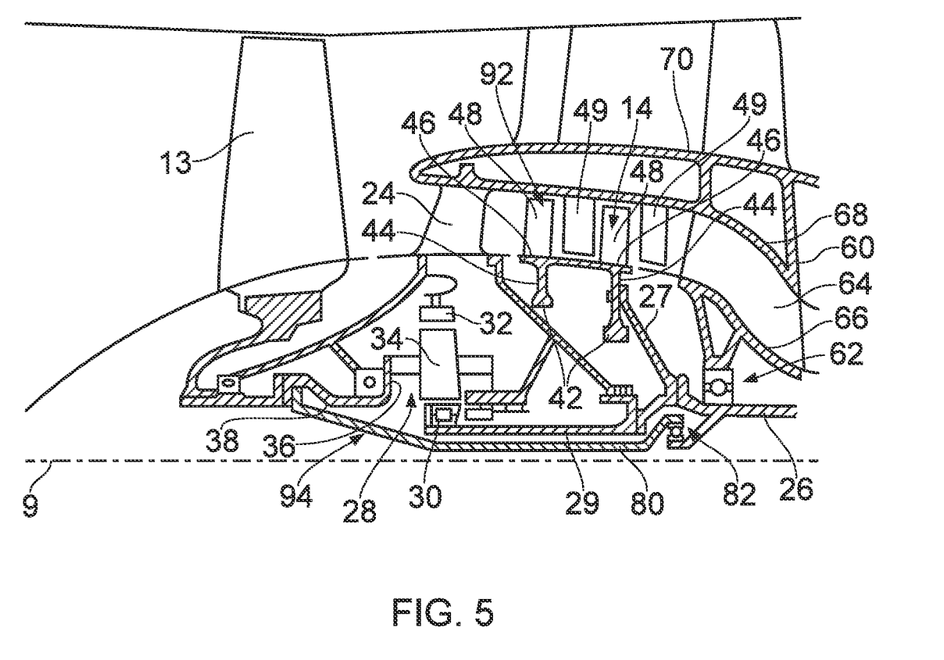
FIG. 5 is an alternative enlarged part cross-sectional view of a portion of the geared turbofan gas turbine engine shown in FIG. 1.
Figure 6:
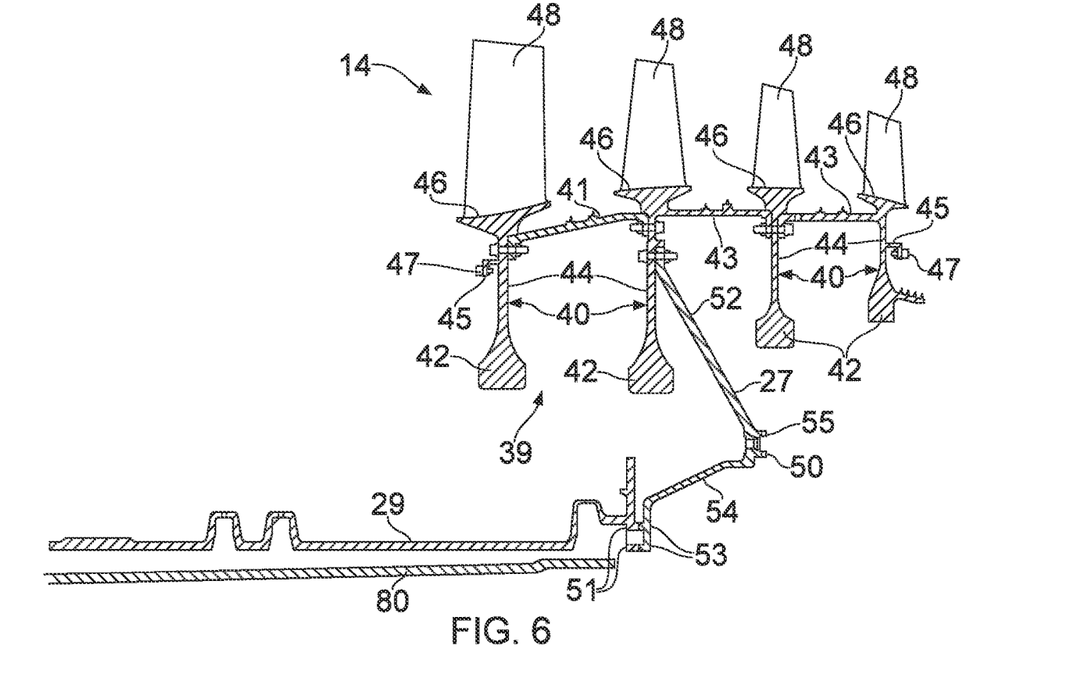
FIG. 6 is an enlarged cross-sectional view though the gearbox input drive shaft and intermediate pressure compressor drive shaft shown in FIG. 5.

An additional arrangement is shown in FIGS. 5 and 6 and the arrangement in FIGS. 5 and 6 is substantially the same as the arrangement shown in FIGS. 2 and 3 and like parts are denoted by like numerals. The arrangement in FIGS. 5 and 6 differs in that the geared turbofan gas turbine engine 10 additionally comprises a propulsor support shaft 80. An upstream end of the propulsor support shaft 80 is located upstream of the gearbox 28, a downstream end of the propulsor support shaft 80 is located downstream of the gearbox 28 and the propulsor support shaft 80 extends axially through and radially within, e.g. radially inside, the gearbox 28 and the gearbox output drive shaft 38. The upstream end of the propulsor support shaft 80 is connected to the fan 13 and/or an upstream end of the gearbox output drive shaft 38. The downstream end of the propulsor support shaft 80 is rotatably mounted on the upstream end of the low pressure shaft 26 by a bearing 82. The bearing 82 is a rolling element bearing, e.g. a ball bearing. The bearing 82 is located axially between the upstream end of the intermediate pressure compressor 15 and the downstream end of the intermediate pressure compressor 15. The bearing 82 is an inter-shaft bearing, e.g. a bearing located between two rotating shafts. The gearbox output shaft 38 and the propulsor support shaft 80 rotate in the same direction as the gearbox input shaft 29 but at a lower rotational speed than the gearbox input shaft 29. The propulsor support shaft 80 and the bearing 82 help to support and locate the fan 13.

Figure 7:
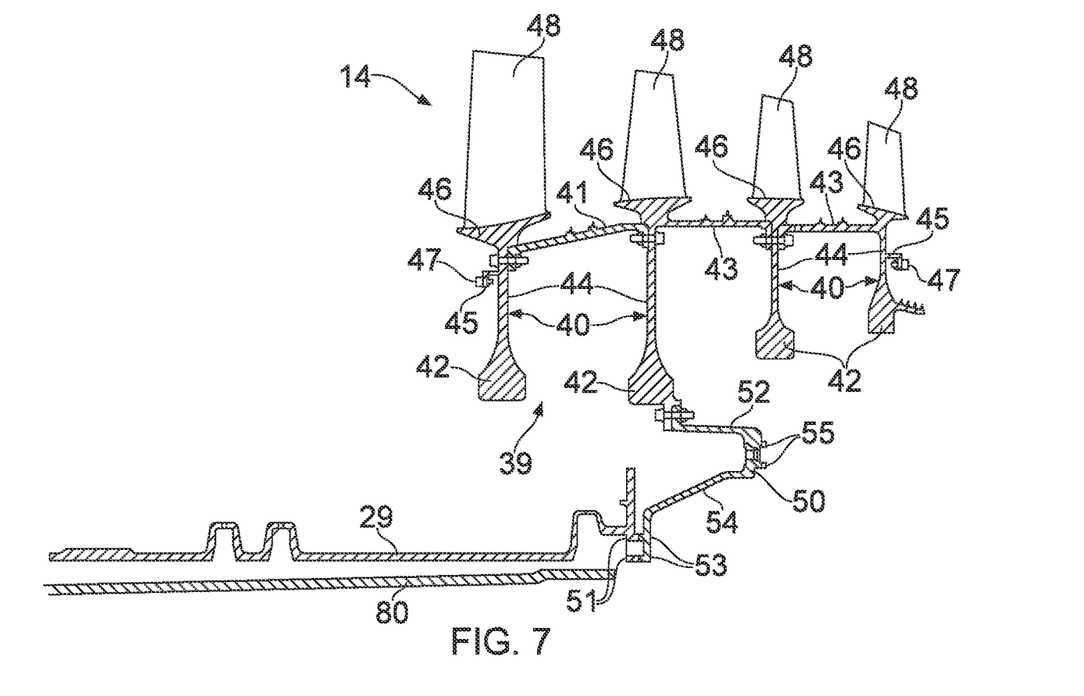
FIG. 7 is an alternative enlarged cross-sectional view though the gearbox input drive shaft and intermediate pressure compressor drive shaft shown in FIG. 5.

Another arrangement is shown in FIG. 7 and the arrangement in FIG. 7 is substantially the same as the arrangement shown in FIGS. 5 and 6 and like parts are denoted by like numerals. The arrangement of FIG. 7 differs in that the radially outer end of the first limb 52 of the V-shaped, or U-shaped, cross-section intermediate pressure compressor drive shaft 27 is connected to the hub 42 of the at least one compressor disc 40 of the compressor rotor 39 of the intermediate pressure compressor 14. The radially outer end of the first limb 52 has a radially outwardly extending flange which is bolted to a radially inwardly extending flange on the hub 42 of a compressor disc 40 of the compressor rotor 39 of the intermediate pressure compressor 14. In another minor variation the flange on the hub 42 of the compressor disc 40 is provided on an axially extending arm and the flange extends radially inwardly or radially outwardly from the arm and the radially outer end of the first limb 52 is provided with a radially outwardly extending flange or a radially inwardly extending flange. The advantage of this arrangement is that there is reduction in the weight of the V-shaped cross-section intermediate pressure compressor drive shaft 27 and hence a reduction in weight of the geared turbofan gas turbine engine 10. In addition it enables the compressor rotor 39 of the intermediate pressure compressor 14 to be built up by sequentially securing axially adjacent compressor discs 40 together before the intermediate pressure compressor drive shaft 27 is connected to the hub 42 of the compressor disc 40. Alternatively the compressor rotor 39 of the intermediate pressure compressor 14 is built up in the same manner as that for the FIG. 6 by sequentially securing axially adjacent compressor discs 40 together until the compressor disc 40 to which the intermediate compressor drive shaft 27 is to be attached and then attaching the intermediate compressor drive shaft 27 to that compressor disc 40 and then continuing sequentially securing axially adjacent compressor discs 40 together.

Figure 8:
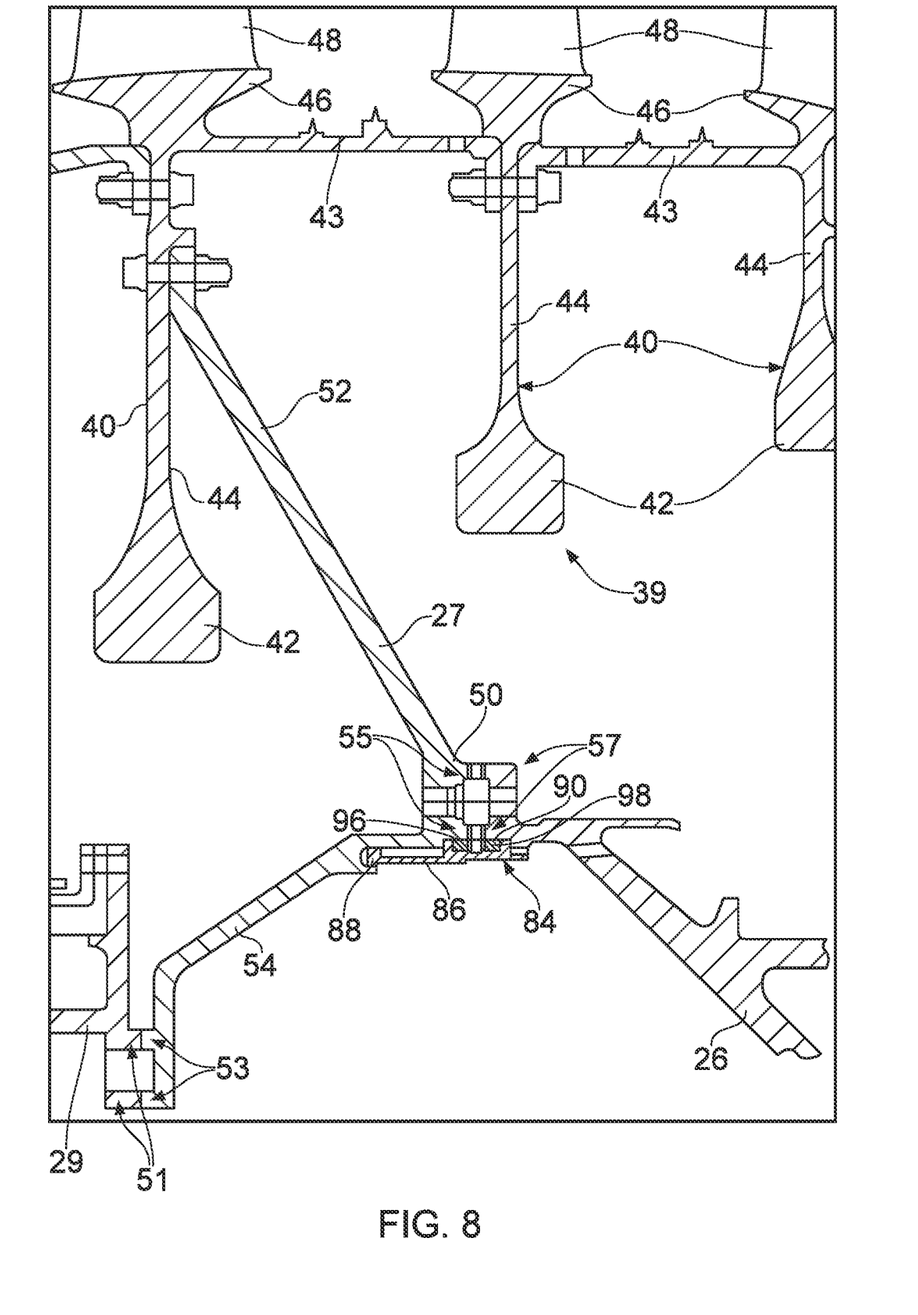
FIG. 8 is a further enlarged cross-sectional view though the gearbox input drive shaft and intermediate pressure compressor drive shaft shown in FIG. 7.

It is to be noted in FIGS. 5, 6 and 7 that the base 50 of the V-shaped cross-section intermediate pressure compressor drive shaft 27 and the upstream end of the low pressure shaft 26 are arranged around, e.g. coaxially around, the bearing 82 between the downstream end of the fan support shaft 80 and the upstream end of the low pressure shaft 26. The base 50 of the V-shaped cross-section intermediate pressure compressor drive shaft 27 and the upstream end of the low pressure shaft 26 are aligned generally axially with the bearing 82 between the downstream end of the fan support shaft 80 and the upstream end of the low pressure shaft 26. A seal arrangement is provided to seal between base 50 of the V-shaped cross-section intermediate pressure compressor drive shaft 27 and the upstream end of the low pressure shaft 26. FIG. 8 shows a seal 84 that is provided to control, or prevent, leakage of lubricant from the bearing 82 though the half curvic couplings 55 and 57 on the intermediate pressure compressor drive shaft 27 and the low pressure shaft 26 respectively in the arrangement shown in FIG. 6, but may be used with FIG. 7. The seal 84 comprises an annular member 86 and the annular member 86 has an axially upstream end which locates in an annular slot 88 in the radially inner surface of the second limb 54 of the V-shaped, or U-shaped, cross-section intermediate pressure compressor drive shaft 27 and an axially downstream end which abuts the radially inner surface of the low pressure drive shaft 26 adjacent but downstream of the half curvic coupling 55. The annular member 86 has an intermediate portion which locates in an annular groove 90 defined in part by the base 50 of the V-shaped cross-section intermediate pressure compressor drive shaft 27 adjacent the half curvic coupling 55 and the low pressure drive shaft 26 adjacent the half curvic coupling 57. The annular member 86 is provided with a suitable seal 96 at a first side of the half curvic couplings 55 and 57 and a suitable seal 98 at a second side of the half curvic couplings 55 and 57 which seal against the radially inner surface of the intermediate pressure compressor drive shaft 27 and the radially inner surface of the low pressure drive shaft 26 respectively. In this arrangement both of the seals 96 and 98 are located in the annular groove 90. In another arrangement the seal 96 is located at the axially upstream end of the annular member 86 and seals against the radially inner surface of the intermediate pressure compressor drive shaft 27 and the seal 98 is located in the annular groove 90. The seals 96 and 98 are O ring seals but other suitable seals may be used.

In all of the embodiments of the present disclosure the compressor rotor 39 and the compressor rotor 39 blades 48 of the intermediate pressure compressor 14 and the V shaped cross-section section intermediate pressure compressor drive shaft 27 define an intermediate pressure compressor module 92. The compressor rotor 39 39 of the intermediate pressure compressor module 92 comprises one or more compressor discs 40. The intermediate pressure compressor module 92 is balanced as a separate unit. The intermediate pressure compressor module 92 is balanced by providing power to rotate the intermediate pressure compressor module 92 though the half curvic coupling 53 or the half curvic coupling 55. The intermediate pressure compressor module 92 is balanced by adding weights and/or removing material from the intermediate pressure compressor module 92 at appropriate circumferentially positions. The intermediate pressure compressor module 92 may be balanced by adding weights and/or removing material from one or more balancing lands 45, e.g. by providing fasteners, e.g. nuts and/or bolts, with different weights and/or the material may be removed from balancing lands 45 on the compressor discs 40, the spacer rings 41 and/or the axially extending arms 43.

The rotating components of the gearbox 28, the gearbox input drive shaft 29 and the gearbox output drive shaft define 38 a gearbox module 94. The gearbox module 94 is balanced as a separate unit. The rotating components of the gearbox 28 in this example, a planetary gearbox, are the gearbox input drive shaft 29, the sun gear 30, the planet gears 32, the planet gear carrier 36 and the gearbox output drive shaft 38. In a star gearbox the rotating components are the gearbox input drive shaft 29, the sun gear 30, the planet gears 32, the annulus gear 34 and the gearbox output drive shaft 38. In a differential gearbox the rotating components are the gearbox input drive shaft 29, the sun gear 30, the planet gears 32, the annulus gear 34, the planet gear carrier 36 and two gearbox output drive shafts 38.

In operation the intermediate pressure compressor module 92 is a relatively high momentum/inertia module, e.g. has a higher momentum/inertia than the gearbox module 94, and it is much more important to balance the intermediate pressure compressor module 92 than the gearbox module 94. In operation the intermediate compressor module 92 rotates at a higher rotational velocity than the planet gear carrier and/or the annulus gear and has a greater mass than the planet gear carrier and/or the annulus gear. In operation the intermediate compressor module 92 rotates at the same rotational velocity as the gearbox input drive shaft and the sun gear but has a much greater mass than gearbox input drive shaft and the sun gear.

The intermediate pressure compressor drive shaft and the gearbox input drive shaft may be formed from the same metal, e.g. steel or titanium, or the intermediate pressure compressor drive shaft and the intermediate pressure compressor may be formed from different metals, e.g. steel and titanium alloy respectively. The intermediate pressure compressor drive shaft and the compressor rotor may be made from the same metal, e.g. titanium, or the intermediate pressure compressor drive shaft and the compressor rotor may be made from different metals, e.g. steel and titanium respectively.

In all of the embodiments of the present disclosure the gearbox input drive shaft 29 is part of the gearbox module 94 and is not a part of the intermediate pressure compressor module 92. The intermediate pressure compressor module 92 is assembled into the geared gas turbine engine 10 by aligning and mating, inter-engaging, the half curvic coupling 55 on the intermediate pressure compressor drive shaft 27 with the half curvic coupling 57 on the upstream end of the low pressure shaft 26 and then securing the intermediate pressure compressor drive shaft 27 to the low pressure shaft 26 via fasteners, e.g. nuts and bolts. The gearbox module 94 is assembled into the intermediate pressure compressor module 92 by aligning and mating, inter-engaging, the half curvic coupling 51 on the gearbox input drive shaft 29 with the half curvic coupling 53 on the intermediate pressure compressor drive shaft 27 and then securing the gearbox input drive shaft 29 to the intermediate pressure compressor drive shaft 27 via fasteners, e.g. nuts and bolts. Thus, it is much easier to inter-engage the half curvic couplings 51 and 53 on the gearbox input drive shaft 29 and the intermediate pressure compressor drive shaft 27 than to inter-engage internal splines on the sun gear and splines on the gearbox input drive shaft.

In all of the embodiments of the present disclosure there are radially inner and radially outer half curvic couplings on the base of the V shaped cross-section section intermediate pressure compressor drive shaft and the upstream end of the low pressure shaft and the bolts are located radially between the radially inner and radially outer half curvic couplings.

In all of the embodiments of the present disclosure there are radially inner and radially outer half curvic couplings on the radially inner end of the second limb of the V shaped cross-section section intermediate pressure compressor drive shaft and the downstream end of the gearbox input drive shaft and the bolts are located radially between the radially inner and radially outer half curvic couplings.

The present disclosure has the advantage of enabling better modularity between the gearbox and the intermediate pressure compressor, simplifies and provides consistency of assembly and disassembly of the intermediate pressure compressor module and the gearbox module and the building of the intermediate pressure compressor module and the gearbox module into the geared turbofan gas turbine engine. The present disclosure enables the intermediate pressure compressor module to be balanced more easily. The present disclosure enables the intermediate pressure compressor drive shaft to be secured to the gearbox input drive shaft without the need for taper bolts and hence provides a cost reduction and weight reduction. The elimination of the taper bolts also increases the strength and rigidity of the connection between the intermediate pressure drive shaft and the low pressure shaft and the strength and rigidity of the connection between the intermediate pressure compressor drive shaft and the gearbox input drive shaft. The present disclosure provides half curvic couplings between the low pressure shaft and the intermediate pressure compressor drive shaft and half curvic couplings between the intermediate pressure drive shaft and the gearbox input drive shaft to allow easy and consistent assembly and disassembly for repair or replacement of the gearbox module and/or the intermediate pressure compressor module.

Although the present disclosure has referred to the use of half curvic couplings on the low pressure shaft and the intermediate pressure compressor drive shaft it is equally possible to use half Hirth couplings. Although the present disclosure has referred to the use of half curvic couplings on the intermediate pressure compressor drive shaft and the gearbox input drive shaft it is equally possible to use half Hirth couplings. A Hirth coupling comprises a plurality of radially extending interlocking teeth provided on the two halves of the Hirth coupling, as is well known to a person skilled in the art. The teeth are generally triangular in cross-section. A curvic coupling comprises a plurality of radially extending interlocking splines provided on the two halves of the curvic coupling, as is well known to a person skilled in the art. The splines are generally isosceles trapezium in cross-section.

The planet gear carrier may comprise a first ring, a second ring spaced axially from the first ring and a plurality of circumferentially spaced axles extending axially between the first ring and the second ring, each planet gear being rotatably mounted on a respective one of the axles.

In the arrangements described above the sun gear is driven by the gearbox input drive shaft, the annulus gear is secured to static structure and the planet gear carrier is arranged to drive the fan via the gearbox output drive shaft.

Alternatively, the sun gear may be driven by the gearbox input drive shaft, the planet gear carrier is secured to static structure and the annulus gear is arranged to drive the fan via the gearbox output drive shaft.

Although in the arrangements described above the gearbox has driven a fan it is equally possible for the gearbox to drive or a propeller. The fan and the propeller are generally known as a propulsor.

As described above, the gas turbine engine comprises a propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the propulsor via a gearbox.

Alternatively, the gas turbine engine comprises a first propulsor, a second propulsor, an intermediate-pressure compressor, a high-pressure compressor, a high-pressure turbine and a low-pressure turbine, the high-pressure turbine is arranged to directly drive the high-pressure compressor, the low-pressure turbine is arranged to directly drive the intermediate-pressure compressor and the low-pressure turbine is arranged to drive the first propulsor and the second propulsor via a gearbox.

The sun gear may be driven by a low-pressure turbine, the annulus gear may be secured to static structure and the planet gear carrier may be arranged to drive a propulsor.

The sun gear may be driven by the low-pressure turbine, the planet gear carrier may be secured to static structure and the annulus gear may be arranged to drive a propulsor. In this arrangement the planet gears are termed star gears and the annular extension of the planet gear carrier is secured to the static structure. In this arrangement each planet gear rotates about its own axis and the planet gear carrier does not rotate about the engine axis. The axes of the planet gears are parallel to the engine axis.

The planet gear carrier may be driven by the low-pressure turbine, the sun gear may be secured to static structure and the annulus gear may be arranged to drive a propulsor.

The sun gear may be driven by the low-pressure turbine, the planet gear carrier may be arranged to drive a first propulsor and the annulus gear may be arranged to drive a second propulsor.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising a propulsor, an intermediate pressure compressor, a high pressure compressor, a high pressure turbine, a low pressure turbine and a gearbox,
the high pressure turbine being arranged to drive the high pressure compressor via a high pressure shaft,
the low pressure turbine being arranged to drive the intermediate pressure compressor via a low pressure shaft and an intermediate pressure compressor drive shaft,
the low pressure turbine being arranged to drive the propulsor via the low pressure shaft, a gearbox input drive shaft, the gearbox and a gearbox output drive shaft,
the intermediate pressure compressor drive shaft having a V-shaped cross-section, the V-shaped cross-section intermediate pressure compressor drive shaft having a base positioned farther from an engine rotational axis than the gearbox input drive shaft, a first limb extending from the base and a second limb extending at an angle radially inwardly from the base toward the gearbox input drive shaft, a radially outer end of the first limb of the V-shaped cross-section intermediate pressure compressor drive shaft being removably connected to the intermediate pressure compressor, a radially inner end of the second limb of the V-shaped cross-section intermediate pressure compressor drive shaft being removably connected to the gearbox input drive shaft and the base of the V-shaped cross-section intermediate pressure compressor drive shaft being removably connected to an upstream end of the low pressure shaft.

2. A gas turbine engine as claimed in claim 1, wherein the radially outer end of the first limb of the V-shaped cross-section intermediate pressure compressor drive shaft is removably connected to the intermediate pressure compressor by a bolted joint.

3. A gas turbine engine as claimed in claim 1, wherein the radially inner end of the second limb of the V-shaped cross-section intermediate pressure compressor drive shaft is removably connected to the gearbox input drive shaft by a curvic coupling or a Hirth coupling.

4. A gas turbine engine as claimed in claim 1, wherein the base of the V-shaped cross-section intermediate pressure compressor drive shaft is removably connected to the upstream end of the low pressure shaft by a curvic coupling or a Hirth coupling.

5. A gas turbine engine as claimed in claim 1, wherein the intermediate pressure compressor comprises at least one compressor disc carrying a stage of compressor rotor blades, the at least one compressor disc comprising a hub, a web and a rim, the compressor rotor blades being arranged on the rim of each compressor disc of the at least one compressor disc.

6. A gas turbine engine as claimed in claim 5, wherein the radially outer end of the first limb of the V-shaped cross-section intermediate pressure compressor drive shaft is connected to the web of the at least one compressor disc of the intermediate pressure compressor.

7. A gas turbine engine as claimed in claim 5, wherein the radially outer end of the first limb of the V-shaped cross-section intermediate pressure compressor drive shaft is connected to the hub of the at least one compressor disc of the intermediate pressure compressor.

8. A gas turbine engine as claimed in claim 1, wherein the low pressure shaft is rotatably mounted in a static structure by a bearing, the bearing being located at an upstream region of the low pressure shaft and downstream of the upstream end of the low pressure shaft.

9. A gas turbine engine as claimed in claim 1 comprising a propulsor support shaft, an upstream end of the propulsor support shaft being located upstream of the gearbox and being connected to the propulsor, a downstream end of the propulsor support shaft being located downstream of the gearbox, the propulsor support shaft extending through and radially inside the gearbox and the gearbox output drive shaft and the downstream end of the propulsor support shaft being rotatably mounted on the upstream end of the low pressure shaft by a bearing.

10. A gas turbine engine as claimed in claim 9, wherein the base of the V-shaped cross-section intermediate pressure compressor drive shaft and the upstream end of the low pressure shaft are arranged around the bearing at the downstream end of the propulsor support shaft.

11. A gas turbine engine as claimed in claim 10, wherein a seal arrangement is provided to seal between base of the V-shaped cross-section intermediate pressure compressor drive shaft and the upstream end of the low pressure shaft.

12. A gas turbine engine as claimed in claim 1, wherein the gearbox comprises a sun gear, an annulus gear, a plurality of planet gears and a planet gear carrier, the sun gear meshing with the planet gears and the planet gears meshing with the annulus gear, each of the planet gears being rotatably mounted in the planet gear carrier.

13. A gas turbine engine as claimed in claim 12, wherein the planet gear carrier comprises a first ring, a second ring spaced axially from the first ring and a plurality of circumferentially spaced axles extending axially between the first ring and the second ring, each of the planet gears being rotatably mounted on a respective one of the axles.

14. A gas turbine engine as claimed in claim 12, wherein the sun gear is driven by the gearbox input drive shaft, the annulus gear is secured to static structure, and the planet gear carrier is arranged to drive the propulsor.

15. A gas turbine engine as claimed in claim 1, wherein the propulsor is a fan or a propeller.

16. A gas turbine engine as claimed in claim 1, wherein the V-shaped cross-section intermediate pressure compressor drive shaft is a monolithic piece.

* * * * *